US008013250B2

(12) United States Patent
Hurrell et al.

(10) Patent No.: US 8,013,250 B2
(45) Date of Patent: Sep. 6, 2011

(54) CABLE ENTRY SEAL FOR PASSING A CABLE THROUGH A STRUCTURE

(75) Inventors: David A. Hurrell, Orinda, CA (US); Inho Myong, Newark, CA (US)

(73) Assignee: Tyco Electronics Corporation, Berwyn, PA (US)

( * ) Notice: Subject to any disclaimer, the term of this patent is extended or adjusted under 35 U.S.C. 154(b) by 146 days.

(21) Appl. No.: 12/477,580

(22) Filed: Jun. 3, 2009

(65) Prior Publication Data

US 2010/0307816 A1 Dec. 9, 2010

(51) Int. Cl.
*H02G 3/18* (2006.01)

(52) U.S. Cl. .......................................... 174/93; 174/653

(58) Field of Classification Search ..................... 174/93, 174/653, 655
See application file for complete search history.

(56) References Cited

U.S. PATENT DOCUMENTS

| | | | | | |
|---|---|---|---|---|---|
| 1,473,362 | A | * | 11/1923 | Tilton | ........................ 285/154.1 |
| 2,941,025 | A | * | 6/1960 | Wayman | ........................ 174/653 |
| 4,371,172 | A | | 2/1983 | de Vienne | |
| 4,379,204 | A | | 4/1983 | Perrault et al. | |
| 4,787,657 | A | | 11/1988 | Henniger | |
| 4,789,759 | A | | 12/1988 | Jones | |
| 4,900,068 | A | * | 2/1990 | Law | ........................... 285/139.2 |
| 5,072,072 | A | * | 12/1991 | Bawa et al. | ........................ 174/655 |
| 5,350,204 | A | | 9/1994 | Henniger | |
| 5,927,892 | A | * | 7/1999 | Teh-Tsung | ........................ 403/259 |
| 6,409,179 | B1 | | 6/2002 | Daoud | |
| 6,448,496 | B1 | | 9/2002 | Daoud | |
| 6,573,455 | B1 | | 6/2003 | Radelet | |
| 6,890,006 | B2 | | 5/2005 | Crestin et al. | |
| 7,097,486 | B2 | | 8/2006 | Parsons | |
| 2006/0172578 | A1 | | 8/2006 | Parsons | |
| 2007/0227772 | A1 | * | 10/2007 | Heimlicher et al. | .......... 174/653 |

OTHER PUBLICATIONS

Nylon Stuffing Tubes, dorn equipment corp., product information from website—http://www.dornequipment.com/stuffing_tubes/index.html, (1) pg.
Cooper-CEAG, Explosion Protection products from website—http://www.ceag.de/en/Explosion_Protection/Products/5_Ex-Installation_Units_and_Material/Ex-Cable_Entries_in_Plastic_Design, (2) pgs.
Capri Industry Products, Cooper Industries product information from website—http:/www.capri-codec.com/industrie/en/home.htm, (1) pg.
Roxtec: Startpage, product information from website—http://www.roxtec.com/.
Wiska—cable glands—fixing—junction boxes—reefer sockets, Wiska product information from website—http:/www.wiska.de/eng/index.html, (1) pg.
Cable End Seals, Nu-Tech product information from website—http:/www.crosstech.us/nu-tech/, (3) pgs.
Raychem Heat-Shrinkable Cable Entry Seals (CESs), Accessories Information Sheets, from Tyco Electronics Catalog 1654025, Revised Dec. 2004, www.tycoelectronics.com, (4) pages.

* cited by examiner

*Primary Examiner* — Chau N Nguyen

(57) ABSTRACT

A cable entry seal is provided for passing a cable through an opening within a structure. The cable entry seal includes a body extending a length. A passageway extends through the length of the body. The passageway is configured to receive the cable therethrough. The body includes a flange and a seal fitting extending outwardly from the flange along the length of the body. The seal fitting includes an exterior sealing surface. The cable entry seal includes a seal conduit having a sealing end surrounding and sealingly engaged with the exterior sealing surface of the seal fitting. The seal conduit is configured to surround the cable when the cable is received through the passageway of the body. The cable entry seal includes a lock ring connected to the body. The lock ring surrounds and sealingly engages with the sealing end of the seal conduit such that the sealing end is held between the exterior sealing surface of the seal fitting and the lock ring.

12 Claims, 11 Drawing Sheets

CABLE ENTRY SEAL FOR PASSING A CABLE THROUGH A STRUCTURE

BACKGROUND OF THE INVENTION

The subject matter described and/or illustrated herein relates generally to cables, and, more particularly, to a cable entry seal for passing a cable through a structure.

Cables are often routed through various structures such as walls, bulkheads, panels, and/or the like. For example, cables are sometimes routed through a structure that defines a boundary of an enclosure. The interior of the enclosure may be a protected environment while the exterior of the enclosure may be an unprotected environment subject to varying conditions, such as inclement weather, heat, cold, dirt, debris, moisture, sunlight, and/or the like. To pass the cable into or out of the interior of the enclosure, the cable is received through an opening within the structure. While the opening provides access to the interior of the enclosure, the opening may also allow undesirable substances into the protected enclosure and/or may expose the interior of the enclosure. For example, the opening may allow dirt, debris, and/or moisture into the enclosure, and/or may expose the interior of the enclosure to inclement weather, heat, cold, and/or sunlight.

Cable entry seals are typically used to seal the opening within the structure through which the cable is received. Specifically, cable entry seals include a body that extends through, and is sealingly engaged with, the structure opening. The body includes a passageway for receiving the cable therethrough. An environmental seal, such as a boot or conduit, surrounds the cable and the body at an entry of the passageway to seal the cable to the entry. However, at least some known environmental seals are bonded to the body using an epoxy, which may increase a cost of the cable entry seal and/or may increase a difficulty of installing the cable entry seal. Moreover, at least some known environmental seals are fabricated using a molding process, which may increase a cost of the environmental seal.

The bodies of cable entry seals are typically held on the structure using a fastener on both sides of the structure. For example, the body may include a flange and a threaded nipple that extends from the flange and is received through the structure opening. The flange engages the structure on one side, while a nut is threaded onto the nipple and engages the structure on the other side. The nut and flange are tightened relative to each other to securely clamp the body onto the structure. Accordingly, an installer must have access to both sides of the structure to install the cable entry seal. Specifically, using the installer's hands and/or tools, an installer must grasp both the flange on one side of the structure and the nut on the other side of the structure, which may increase a difficulty of installing the cable entry seal.

BRIEF DESCRIPTION OF THE INVENTION

In one embodiment, a cable entry seal is provided for passing a cable through an opening within a structure. The cable entry seal includes a body extending a length. A passageway extends through the length of the body. The passageway is configured to receive the cable therethrough. The body includes a flange and a seal fitting extending outwardly from the flange along the length of the body. The seal fitting includes an exterior sealing surface. The cable entry seal includes a seal conduit having a sealing end surrounding and sealingly engaged with the exterior sealing surface of the seal fitting. The seal conduit is configured to surround the cable when the cable is received through the passageway of the body. The cable entry seal includes a lock ring connected to the body. The lock ring surrounds and sealingly engages with the sealing end of the seal conduit such that the sealing end is held between the exterior sealing surface of the seal fitting and the lock ring.

In another embodiment, a cable entry seal is provided for passing a cable through an opening within a structure. The structure has opposite first and second sides. The cable entry seal includes a body extending a length. A passageway extends through the length of the body. The passageway is configured to receive the cable therethrough. The body includes a flange and a nipple extending outwardly from the flange. The flange extends on the first side of the structure. The cable entry seal also includes a collapsible nut including a base, a fastener, and a collapsible wall extending from the base to the fastener. The base extends on the first side of the structure. The collapsible wall is received through the opening and extends outwardly from the opening on the second side of the structure. The flange of the body is engaged with the base. The fastener is connected to the nipple of the body. The collapsible wall is at least partially collapsed and engaged with the structure on the second side of the structure.

In another embodiment, a cable entry seal is provided for passing a cable through an opening within a structure. The cable entry seal includes a body extending a length. A passageway extends through the length of the body. The passageway is configured to receive the cable therethrough. The body includes a flange and a seal fitting extending outwardly from the flange. The seal fitting includes an exterior sealing surface and a ledge. The ledge is spaced from the exterior sealing surface to define a radial gap between the exterior sealing surface and the ledge. The ledge includes a tab extending from the ledge toward the exterior sealing surface. A seal conduit has a sealing end surrounding and sealingly engaged with the exterior sealing surface of the seal fitting. The sealing end is received within the radial gap between the ledge and the exterior sealing surface. The sealing end is engaged by the tab. The seal conduit is configured to surround the cable when the cable is received through the passageway of the body.

DETAILED DESCRIPTION OF THE INVENTION

Figure 1:
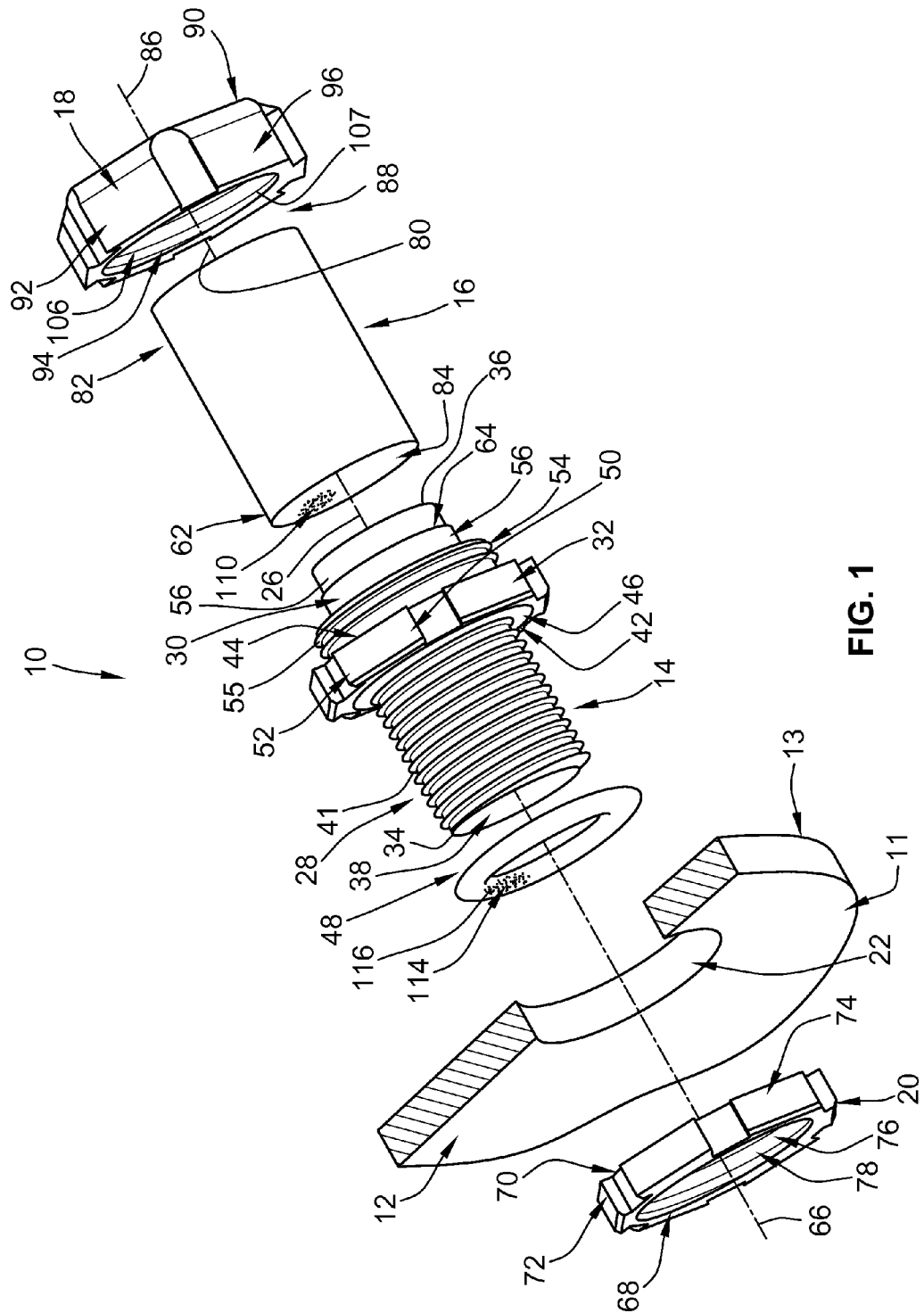
FIG. 1 is an exploded perspective view of an exemplary embodiment of a cable entry seal and an exemplary structure.

FIG. 1 is exploded perspective view of an exemplary embodiment of a cable entry seal 10 and an exemplary structure 12. The cable entry seal 10 includes a body 14, a seal conduit 16, a lock ring 18, and a fastener 20. The structure 12 includes a side 11, a side 13 opposite the side 11, and an opening 22 extending through the structure 12. The cable entry seal 10 is configured to pass a cable 24 (FIGS. 4, 5, and 7) through the opening 22 within the structure 12. The structure 12 may be any type of structure such as, but not limited to, a wall, a bulkhead, a panel, and/or the like. In some embodiments, the structure 12 defines a boundary of an enclosure (not shown). Optionally, an interior of the enclosure is a protected environment and an exterior of the enclosure is an unprotected environment subject to varying conditions, such as, but not limited to, inclement weather, heat, cold, dirt, debris, moisture, sunlight, and/or the like.

As used herein, the term "cable" is intended to mean one or more conductors surrounded by one or more insulators. For example, as used herein, the term "cable" includes a single conductor surrounded by an insulator, a plurality of conductors surrounded by a single insulator, a plurality of leads that each includes one or more conductors surrounded by an insulator (whether or not the plurality of leads are surrounded by an insulating jacket), and/or the like. Each conductor of the cable may include a single or a plurality of strands. Moreover, each conductor may conduct electricity, electromagnetic (optical) radiation, thermal energy, and/or the like. In the exemplary embodiment, the opening 22 of the structure 12 includes a cylindrical shape, however, the opening 22 may additionally or alternatively include any other shape(s), such as, but not limited to, a rectangular shape, an oval shape, a triangular shape, and/or the like. The sides 11 and 13 of the structure 12 may each be referred to herein as a "first side" and/or a "second side".

The body 14 of the cable entry seal 10 extends a length along a central longitudinal axis 26 from an end surface 34 to an opposite end surface 36. The cable entry seal body 14 includes a flange 32 extending radially outward relative to the central longitudinal axis 26 and between the end surfaces 34 and 36 along the central longitudinal axis 26. A nipple 28 extends outwardly from the flange 32 along the central longitudinal axis 26 to the end surface 34. A seal fitting 30 extends outwardly from the flange 32 along the central longitudinal axis 26, in an opposite direction relative to the nipple 28, to the end surface 36. A passageway 38 extends through the length of the body 14. Specifically, the passageway 38 extends along the central longitudinal axis 26 through the end surfaces 34 and 36 and completely through the body 14 therebetween. The passageway 38 receives the cable 24 therethrough. In the exemplary embodiment, the passageway 38 includes a cylindrical shape. However, the passageway 38 may include any shape(s) for receiving any shape of the cable 24, such as, but not limited to, a rectangular shape, an oval shape, a triangular shape, and/or the like. The body 14 may include any other shape(s) than is shown herein for being mounted within any shaped opening 22.

In the exemplary embodiment, the nipple 28 includes an external thread 41 for mounting the cable entry seal body 14 on the structure 12 using the fastener 20. The thread 41 extends along an approximate entirety of the length (from the flange 32 to the end surface 34) of the nipple 28. In addition or alternatively to the thread 41, the nipple 28 may include any other type of connection element that enables the body 14 to be connected to the fastener 20 such as, but not limited to, a bayonet-type connection element and/or the like. Moreover, the thread 41 of the nipple 28 may alternatively extend along only a portion(s) of the length of the nipple 28 at any location(s) along the length of the nipple 28 that enables the body 14 to be connected to the fastener 20.

The flange 32 extends a length along the central longitudinal axis 26 from a side 42 to an opposite side 44. The side 42 of the flange 32 includes an optional o-ring groove 46 for receiving an optional o-ring 48 therein. In the exemplary embodiment, a radially outer surface 50 of the flange 32 includes a plurality of wrench flats 52 for grasping the flange 32 with a person's hand (not shown), a tool (not shown), and/or the like. The side 42 of the flange 32 may be referred to herein as a "structure side", while the side 44 of the flange 32 may be referred to herein as a "lock ring side".

Figure 2:
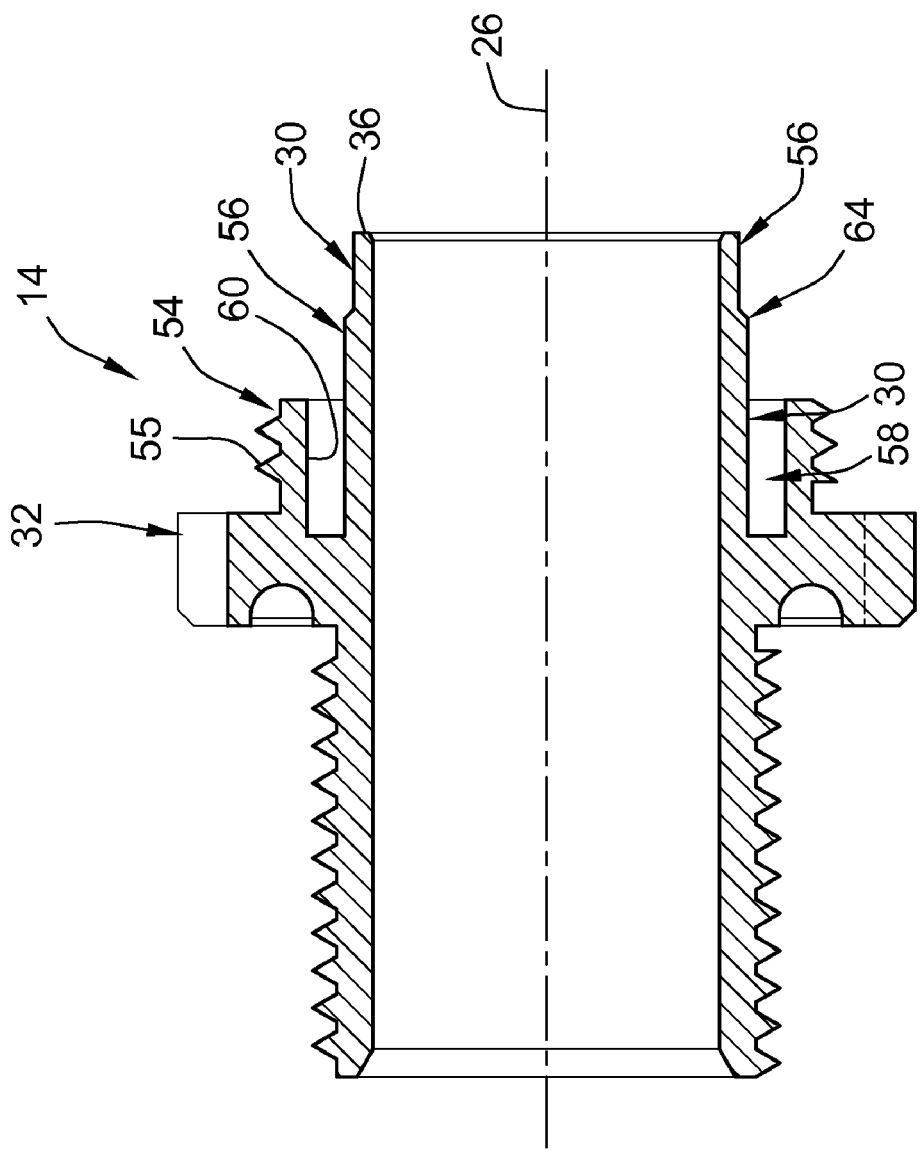
FIG. 2 is a cross-sectional view of an exemplary embodiment of a body of the cable entry seal shown in FIG. 1.

FIG. 2 is a cross-sectional view of an exemplary embodiment of the cable entry seal body 14. Referring now to FIGS. 1 and 2, the body 14 includes a fastener 54 and the seal fitting 30. The seal fitting 30 of the body 14 includes an exterior sealing surface 56. In the exemplary embodiment, the fastener 54 and the seal fitting 30 extend from the flange 32. Specifically, the seal fitting 30 extends outwardly from the flange 32 along the central longitudinal axis 26 to the end surface 36. Moreover, the exterior sealing surface 56 extends outwardly from the flange 32 along the central longitudinal axis 26 to the end surface 36. The fastener 54 extends outwardly from the flange 32 along the central longitudinal axis 26 in a direction toward the end surface 36. The fastener 54 is spaced from the exterior sealing surface 56 radially outward relative to the central longitudinal axis 26. In other words, there is a radial gap 58 (not visible in FIG. 1) between the exterior sealing surface 56 and a radially inner surface 60 (not visible in FIG. 1) of the fastener 54. The radial gap 58 is configured to receive an end 62 (FIGS. 1, 4, 5, and 7) of the seal conduit 16 (FIGS. 1 and 4-7) therein. The exterior sealing surface 56 includes an optional ledge 64. In the exemplary embodiment, the ledge 64 extends at a non-perpendicular angle (such as, but not limited to, approximately 45°) relative to the central longitudinal axis 26. The ledge 64 may alternatively extend approximately perpendicular to the central longitudinal axis 26.

Alternatively, the fastener 54 extends along the central longitudinal axis 26 of the body 14 between the seal fitting 30 and the flange 32. Specifically, in some alternative embodiments, the fastener 54 extends along the central longitudinal axis 26 from the flange 32 to the seal fitting 30, and the seal fitting 30 extends along the central longitudinal axis 26 from the fastener 54 to the end surface 36. In the exemplary embodiment, the fastener 54 includes a thread 55. Additionally or alternatively, the fastener 54 may include any other type of connection element that enables the body 14 to be connected to the lock ring 18 (FIGS. 1 and 3-7) such as, but not limited to, a bayonet-type connection element and/or the like.

Referring now to FIG. 1, the fastener 20 extends a length along a central longitudinal axis 66 from a side 68 to a side 70. As shown in FIG. 1, the central longitudinal axis 66 is aligned with the central longitudinal axis 26 of the body 14. The axes 26 and 66 are therefore not shown separately in FIG. 1. A radially outer surface 72 of the fastener 20 includes a plurality of wrench flats 74 for grasping the fastener 20 with a person's hand (not shown), a tool (not shown), and/or the like. A radially inner surface 76 of the fastener 20 includes a thread 78 that is configured to engage with the thread 41 of the nipple 28 of the body 14. The fastener 20 may include any other type of connection element, in addition or alternatively to the thread 78, that enables the fastener 20 to be connected to the body 14, such as, but not limited to, a bayonet-type connection element and/or the like.

The seal conduit 16 extends a length along a central longitudinal axis 80 from the end 62 to an opposite end 82. As shown in FIG. 1, the central longitudinal axis 80 is aligned with the central longitudinal axis 26 of the body 14 and the central longitudinal axis 66 of the fastener 20. The axes 26, 66, and 80 are therefore not shown separately in FIG. 1. A passageway 84 extends through the length of the seal conduit 16. The passageway 84 receives the cable 24 therethrough. The seal conduit 16 may be fabricated from any material(s) that enable the seal conduit 16 to function as described and/or illustrated herein. Exemplary materials of the seal conduit 16 include, but are not limited to, heat recoverable materials (such as, but not limited to, heat shrinkable materials and/or the like), cold recoverable materials (materials recoverable without the application of heat, such as, but not limited to, cold shrinkable materials and/or the like), plastics, polymers, rubber, elastic materials, and/or the like. The seal conduit 16 may be fabricated using any method, process, structure, means, and/or the like, such as, but not limited to, extrusion, molding, and/or the like. The end 62 may be referred to herein as a "sealing end".

Figure 3:
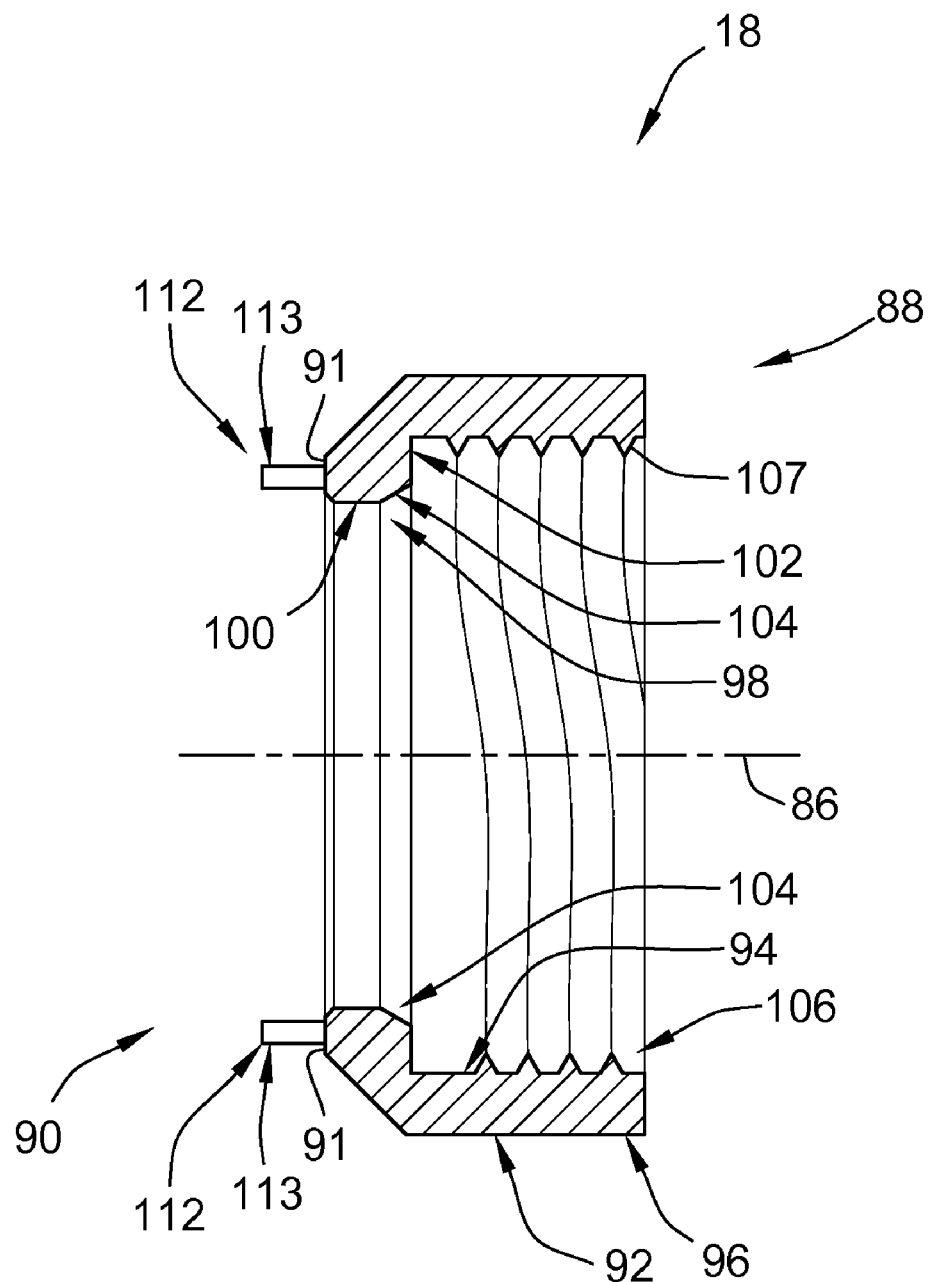
FIG. 3 is a cross-sectional view of an exemplary embodiment of a lock ring of the cable entry seal shown in FIG. 1.

FIG. 3 is a cross-sectional view of an exemplary embodiment of the lock ring 18. Referring now to FIGS. 1 and 3, the lock ring 18 extends a length along a central longitudinal axis 86 from a side 88 to a side 90. As shown in FIG. 1, the central longitudinal axis 86 is aligned with the central longitudinal axes 26, 66, and 80 of the body 14, the fastener 20, and the seal conduit 16, respectively. The axes 26, 66, 80, and 86 are therefore not shown separately in FIG. 1. The side 90 includes a surface 91. The lock ring 18 includes a radially outer surface 92 and a radially inner surface 94. The radially outer surface 92 of the lock ring 18 includes a plurality of wrench flats 96 for grasping the lock ring 18 with a person's hand (not shown), a tool (not shown), and/or the like. The radially inner surface 94 includes a shoulder 98 (not visible in FIG. 1). In the exemplary embodiment, the shoulder 98 includes a wall 100 that extends along the central longitudinal axis 86 and a wall 102 that extends radially inward toward the central longitudinal axis 86. The walls 100 and 102 intersect at an edge 104. In the exemplary embodiment, the edge 104 is curved. Alternatively, the edge 104 is pointed or chamfered.

The radially inner surface 94 of the lock ring 18 includes a fastener 106 that is configured to connect with the fastener 54 of the body 14. In the exemplary embodiment, the fastener 106 is a thread 107. In addition or alternatively to the thread, the fastener 106 may include any other type of connection element that enables the lock ring 18 to be connected to the body 14, such as, but not limited to, a bayonet-type connection element and/or the like.

Figure 4:
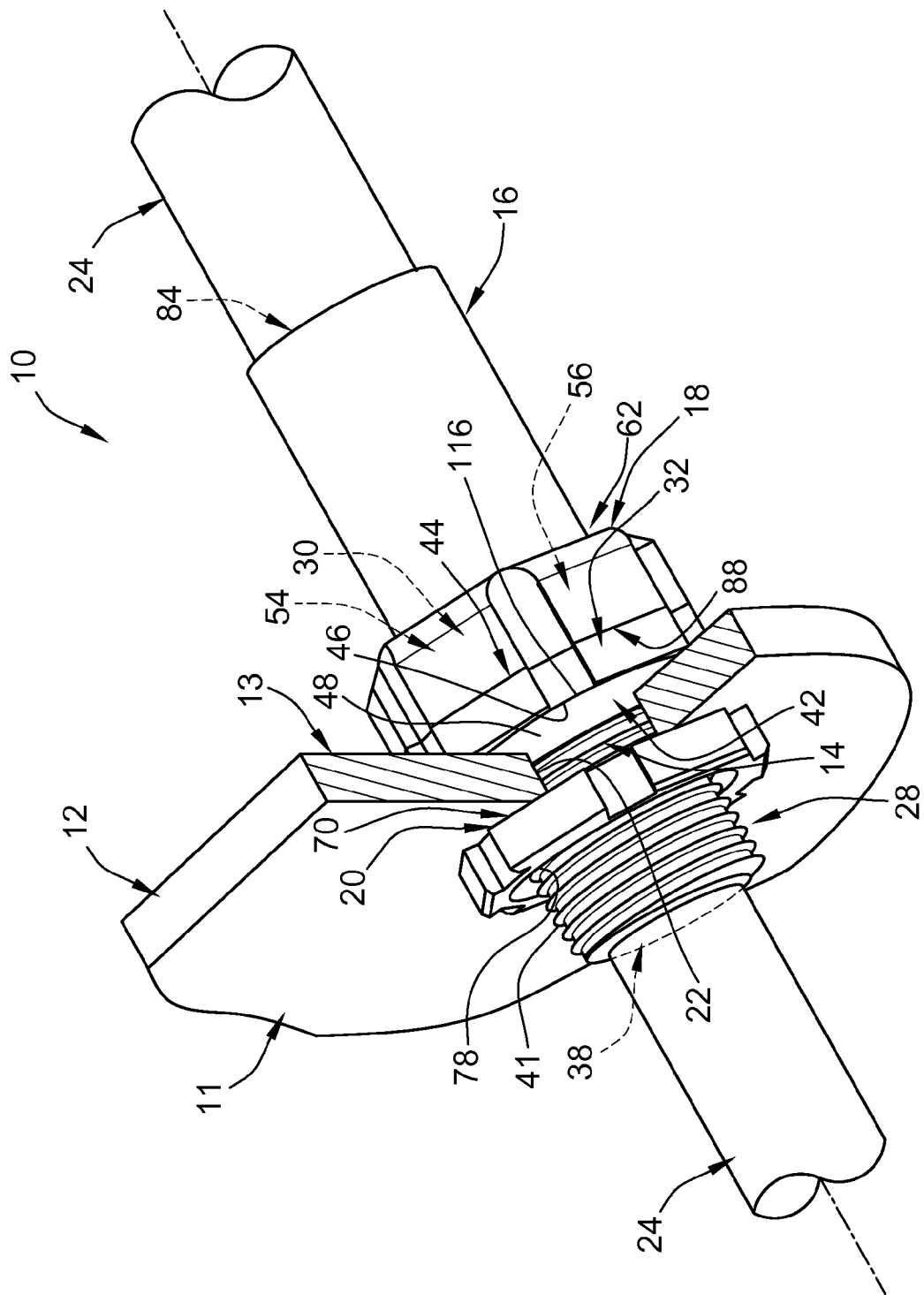
FIG. 4 is a perspective view of the cable entry seal and the structure shown in FIG. 1 illustrating the cable entry seal mounted within an opening of the structure.
Figure 5:
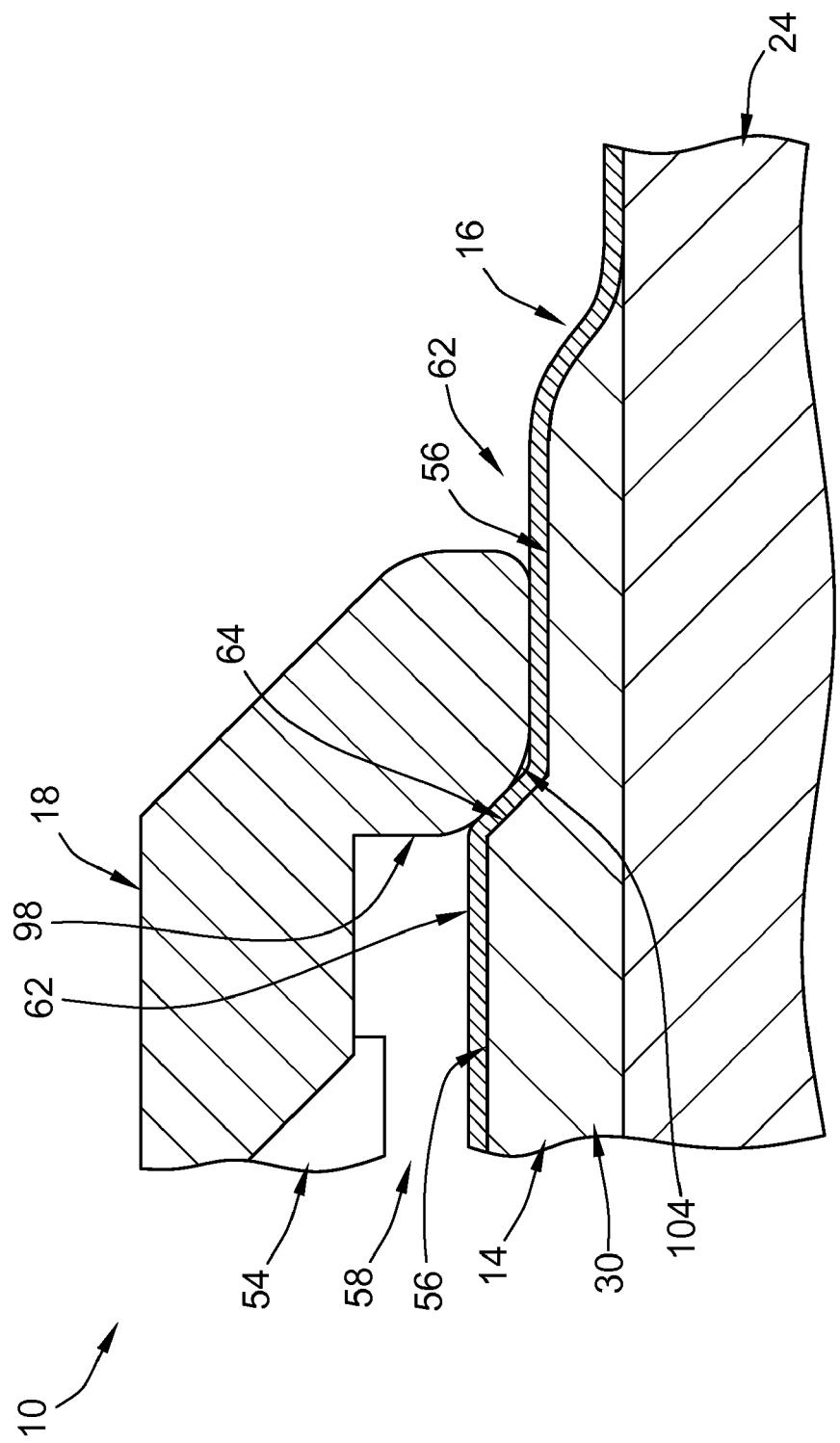
FIG. 5 is an enlarged cross-sectional view of a portion of the cable entry seal shown in FIG. 4.
Figure 7:
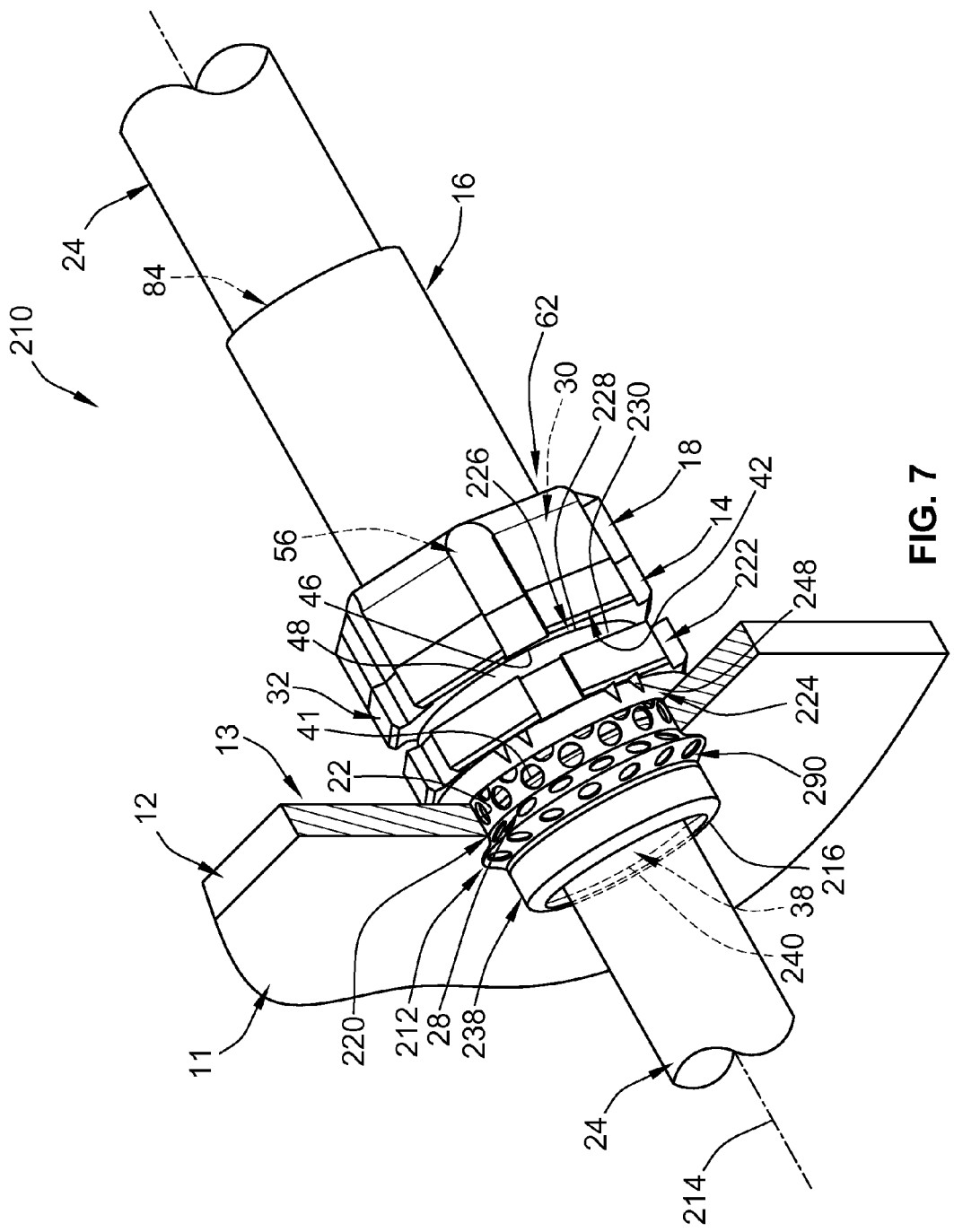
FIG. 7 is a perspective view of the cable entry seal shown in FIG. 6 illustrating the cable entry seal mounted within an opening of a structure.

The lock ring 18 optionally includes a heat indicator 112 (not visible in FIG. 1) for indicating whether excess heat has been applied to the cable entry seal 10. The term "excess heat" is intended to mean a temperature and/or exposure time of heat that may damage the cable entry seal 10 and/or any component thereof. For example, heat is optionally applied to the seal conduit 16 to shrink the end 62 around the seal fitting of the body 14 and/or around the cable 24 (FIGS. 4, 5, and 7). If heat is applied to the seal conduit 16 for too long and/or at too high a temperature, the body 14 and/or the lock ring 18 may distort. In the exemplary embodiment, the heat indicator 112 includes a plurality of rods 113 that extend outward from the surface 91 of the side 90. The rods 113 are configured to melt when subjected to heat over a predetermined temperature and/or over a predetermined duration of time. The predetermined temperature and/or the predetermined duration of time may be selected as a threshold for a temperature and/or an exposure time that may damage the cable entry seal 10 and/or any component thereof. In the exemplary embodiment, each of the rods 113 extends outwardly from the surface 91 approximately parallel to the central longitudinal axis 86. However, each rod 113 may extend outwardly from the surface 91 at any angle relative to the central longitudinal axis 86. The lock ring 18 may include any number of the rods 113. Each rod 113 may be fabricated from any material(s) that enables the rod 113 to melt when subjected to heat over the predetermined temperature and/or over the predetermined duration of time, such as, but not limited to, plastics, polymers, and/or the like.

FIG. 4 is a perspective view of the cable entry seal 10 and the structure 12 illustrating the cable entry seal 10 mounted within the opening 22 of the structure 12. For clarity, the structure 12 has been partially broken away in FIG. 4. Referring now to FIGS. 1 and 4, in the exemplary embodiment, the nipple 28 of the body 14 is received through the opening 22 within the structure 12. The fastener 20 is threadably connected to the nipple 28 of the body 14 via engagement between the threads 41 and 78. Using a person's hand and/or one or more tools (not shown), the flange 32 and the fastener 20 are tightened relative to each other such that the side 70 of the fastener 20 is engaged with the side 11 of the structure 12. When tightened, the side 42 of the body flange 32 sealingly engages the side 13 of the structure 12. Specifically, the o-ring 48 is received within the o-ring groove 46 of the flange 32 and sealingly engages the side 13 of the structure 12 such that the o-ring 48 is compressed between the side 42 of the flange 32 and the side 13 of the structure 12. Alternatively, the cable entry seal 10 does not include the o-ring 48 and the side 42 of the flange 32 is directly sealingly engaged with the side 13 of the structure 12. The structure 12 is thereby held between the fastener 20 and the flange 32 such that the body 14 is securely mounted on the structure 12 within the opening 22. As used herein, the terms "sealingly engages", "sealing engage", "sealingly engaging", "sealingly engaged", and "sealed engagement" are intended to mean direct or indirect engagement between two components such that a seal is formed therebetween.

The cable 24 (not shown in FIG. 1) is received through the passageway 84 within the seal conduit 16 and through the passageway 38 of the body 14. The seal fitting 30 of the body 14 is received within the end 62 of the seal conduit 16 such that the end 62 surrounds and sealingly engages the exterior sealing surface 56 of the seal fitting 30. Although not visible in FIGS. 1 and 4, the end 62 of the seal conduit 16 is received within the radial gap 58 (FIGS. 2 and 5) between the fastener 54 (FIGS. 1, 2, and 5) and the exterior sealing surface 56. FIG. 5 is an enlarged cross-sectional view of a portion of the cable entry seal 10 and illustrates the seal conduit end 62 received within the radial gap 58. Referring again to FIGS. 1 and 4, the seal conduit 16 also surrounds and sealingly engages the cable 24. Optionally, a radially inner surface 108 (not visible in FIG. 4) of the seal conduit 16 includes an adhesive 110 (not visible in FIG. 4) thereon to facilitate sealingly engaging the seal conduit 16 with the cable 24 and/or with the exterior sealing surface 56 of seal fitting 30. The seal conduit 16 is optionally heat shrunk around the exterior sealing surface 56 and/or the cable 24 to facilitate sealingly engaging the seal conduit 16 with the exterior sealing surface 56 and/or the cable 24. If the seal conduit 16 is heat shrunk, melting of the rods 113 will provide a visual indication that the temperature and/or exposure time of heat being applied to the seal conduit 16 may be high enough to damage the cable entry seal 10 and/or component thereof. Optionally, the seal conduit 16 is shrunk around the exterior sealing surface 56 and/or the cable 24 without the application of heat to facilitate sealingly engaging the seal conduit 16 with the exterior sealing surface 56 and/or the cable 24.

The lock ring 18 is threadably connected to the fastener 54 of the body 14 via engagement between the threads 55 and 107 (not visible in FIG. 4). Using a person's hand and/or one or more tools, the flange 32 and the lock ring 18 are tightened relative to each other to secure the end 62 of the seal conduit 16 between the lock ring 18 and the seal fitting 30. When tightened, the side 88 of the lock ring 18 optionally engages the side 44 of the flange 32.

Referring now to FIG. 5, the end 62 of the seal conduit 16 is sealingly engaged between the ledge 64 of the exterior sealing surface 56 and the edge 104 of the shoulder 98 of the lock ring 18. The lock ring 18 facilitates holding the end 62 of the seal conduit 16 on the exterior sealing surface 56 of the seal fitting 30 and facilitates the sealed engagement of the seal conduit 16 with the exterior sealing surface 56. The interface between the cable 24 and the body 14 is thereby sealed via the sealed engagement of the seal conduit 16 with the cable 24 and with the exterior sealing surface 56.

Referring again to FIG. 1, the cable entry seal 10 optionally includes an anti-rotational element 114 for preventing rotation of the cable entry seal 10 within the opening 22 of structure 12. In the exemplary embodiment, the anti-rotational element 114 includes an adhesive 116 applied to the o-ring 48 such that the o-ring 48 is bonded to the side 13 of the structure 12. In addition or alternatively, the adhesive 116 may be applied to the fastener 20 to bond the fastener 20 to the structure 12 and/or may be applied to the body 14 to bond the body 14 to the structure 12. The anti-rotational element 114 may include any other structure, means, and/or the like in addition or alternatively to the adhesive 116, such as, but not limited to, a star washer (not shown) extending between the fastener 20 and the side 11 of the structure 12, a star washer (not shown) extending between the flange 32 and the side 13 of the structure 12, one or more extensions (not shown) on the side 42 of the flange 32 and/or on the side 70 of the fastener 20 for engagement with the structure 12, and/or the like.

Figure 6:
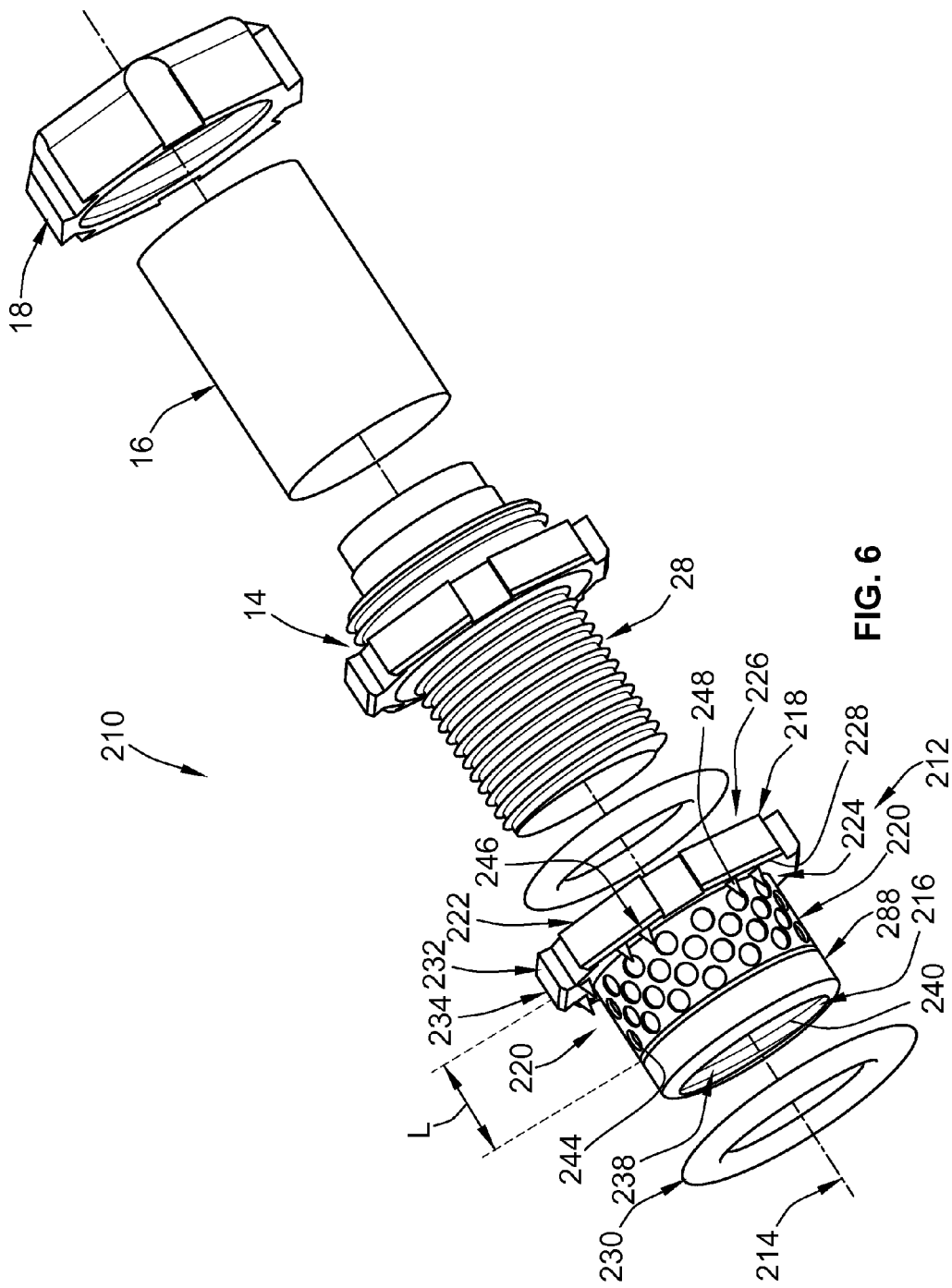
FIG. 6 is an exploded perspective view of an exemplary alternative embodiment of a cable entry seal.

FIG. 6 is exploded perspective view of an exemplary alternative embodiment of a cable entry seal 210. The cable entry seal 210 includes the body 14, the seal conduit 16, the lock ring 18, and a collapsible nut 212. The cable entry seal 210 is configured to pass the cable 24 (FIGS. 4, 5, and 7) through the opening 22 (FIGS. 1, 4, and 7) within the structure 12 (FIGS. 1, 4, and 7). The body 14, the seal conduit 16, and the lock ring 18 are each described above. The collapsible nut 212 extends a length along a central longitudinal axis 214 from an end surface 216 to an opposite end surface 218.

The collapsible nut 212 includes a base 222 extending radially outward relative to the central longitudinal axis 214, a fastener 238, and a collapsible wall 220 extending from the base 222 to the fastener 238. The base 222 extends a length along the central longitudinal axis 214 from a side 224 to an opposite side 226. The side 224 of the base 222 includes an optional o-ring groove 228 for receiving an optional o-ring 230 therein. In the exemplary embodiment, a radially outer surface 232 of the base 222 includes a plurality of wrench flats 234 for grasping the base 222 with a person's hand (not shown), a tool (not shown), and/or the like. In the exemplary embodiment, the base 222 includes an end of the collapsible nut 212. Alternatively, the base 222 does not include an end of the collapsible nut 212.

The fastener 238 includes connects the collapsible nut 212 to the nipple 28 of the body 14. In the exemplary embodiment, the fastener 238 includes a thread 240. The fastener 238 may additionally or alternatively include any other type of connection element that enables the collapsible nut 212 to be connected to the nipple 28, such as, but not limited to, a bayonet-type connection element and/or the like. In the exemplary embodiment, the base fastener 238 includes an end of the collapsible nut 212. Alternatively, the base 222 does not include an end of the collapsible nut 212.

The collapsible wall 220 extends a length from the fastener 238 to the base 222. The collapsible wall 220 is configured to collapse along the central longitudinal axis 214. When the collapsible nut 212 is not collapsed as shown in FIG. 6, the collapsible wall 220 extends a length L. To collapse, portions of the collapsible wall 220 deform radially outward relative to the central longitudinal axis 214 such that the length of the collapsible wall 220 collapses along the central longitudinal axis 214, thereby brining the end surfaces 216 and 218, and therefore the base 222 and the fastener 238, closer together along the central longitudinal axis 214. Specifically, the collapsible wall 220 collapses along the central longitudinal axis 214 from the length L to a length that is less than the length L. The collapsible wall 220 is shown as collapsed in FIG. 7. In the exemplary embodiment, the collapsible wall 220 includes a plurality of optional openings 244 extending therethrough. The openings 244 facilitate enabling the collapsible wall 220 to deform radially outward and thereby collapse. Each of the openings 244 is shown as including a cylindrical shape. However, each opening 244 may include any other shape(s), such as, but not limited to, a rectangular shape, an oval shape, a triangular shape, and/or the like. In addition or alternative to the openings 244, the collapsible wall 220 optionally includes one or more other structures, elements, means, shapes, and/or the like that facilitate enabling the collapsible wall 220 to deform radially outward and thereby collapse. For example, the collapsible wall 220 optionally includes one or more pleats (not shown).

The cable entry seal 210 optionally includes an anti-rotational element 246 for preventing rotation of the cable entry seal 210 within the opening 22 of structure 12. In the exemplary embodiment, the anti-rotational element 246 includes a plurality of extensions 248 on the side 224 of the base 222 for engagement with the side 13 (FIGS. 1, 4, and 7) of the structure 12. In addition or alternatively, the anti-rotational element 246 may include any other structure, means, and/or the like, such as, but not limited to, a star washer (not shown) extending between the base 222 and the side 13 of the structure 12, one or more extensions (not shown) on the collapsible wall 220 for engagement with the structure 12, an adhesive (not shown) applied to the o-ring 230 to bond the o-ring 230 to the side 13 of the structure 12, and/or the like.

FIG. 7 is a perspective view of the cable entry seal 210 and the structure 12 illustrating the cable entry seal 210 mounted within the opening 22 of the structure 12. For clarity, the structure 12 has been partially broken away in FIG. 7. The fastener 238 and the collapsible wall 220 of the collapsible nut 212 are received through the opening 22 within the structure 12 such that the base 222 extends on the side 13 of the structure. Specifically, the side 224 of the base 222 faces the side 13 of the structure 12. When received through the opening 22, the fastener 238 and at least a portion of the collapsible wall 220 extend on the side 11 of the structure 12. The nipple 28 of the body 14 is threadably connected to the collapsible nut 212 via engagement between the threads 41 and 240. Specifically, using a person's hand and/or one or more tools (not shown), the flange 32 of the body 14 and the base 222 of the collapsible nut 212 are tightened relative to each other. Because both the flange 32 of the body 14 and the base 222 of the collapsible nut 212 extend on the side 13 of the structure, an installer only needs access to the side 13 of the structure 12 to tighten the body 14 and the collapsible nut 212 relative to each other.

As the flange 32 of the body 14 and the base 222 of the collapsible nut 212 are tightened relative to each other, the engagement between the threads 41 and 240 pulls the fastener 238 of the collapsible nut 212 in a direction along the central longitudinal axis 214 toward the base 222 of the collapsible nut 212. In other words, the fastener 238 rides along the thread 41 of the nipple 28 toward the base 222. The pulling force causes the collapsible wall 220 to collapse along the central longitudinal axis 214. Specifically, the pulling force causes portions of the collapsible wall 220 to deform radially outward relative to the central longitudinal axis 214 such that the length of the collapsible wall 220 collapses from the length L shown in FIG. 6 to the collapsed position shown in FIG. 7. Once the collapsible wall 220 has collapsed, the portions of the collapsible wall 220 that have deformed radially outward engage the side 11 of the structure 12 such that the structure 12 is held between the deformed portions of the collapsible nut 212 and the base 222 of the collapsible nut 212, as shown in FIG. 7. The body 14 is thereby securely mounted on the structure 12 within the opening 22.

When the body 14 of the cable entry seal 210 is securely mounted on the structure 12 as shown in FIG. 7, the side 224 of the collapsible nut base 222 sealingly engages the side 13 of the structure 12. Specifically, the o-ring 230 is received within the o-ring groove 228 of the base 222 and sealingly engages the side 13 of the structure 12 such that the o-ring 230 is compressed between the side 224 of the base 222 and the side 13 of the structure 12. Alternatively, the cable entry seal 210 does not include the o-ring 230 and the side 224 of the base 222 is directly sealingly engaged with the side 13 of the structure 12.

The side 42 of the body flange 32 sealingly engages the side 226 of the collapsible nut base 222 when the body 14 of the cable entry seal 210 is securely mounted on the structure 12 as shown in FIG. 7. Specifically, the o-ring 48 is received within the o-ring groove 46 of the body flange 32 and sealingly engages the side 226 of the structure 12 such that the o-ring 48 is compressed between the side 42 of the body flange 32 and the side 226 of the base 222. Alternatively, the cable entry seal 210 does not include the o-ring 48 and the side 42 of the body flange 32 is directly sealingly engaged with the side 226 of the base 222.

The cable 24 is received through the passageway 84 within the seal conduit 16 and through the passageway 38 of the body 14. The end 62 of the seal conduit 16 surrounds and sealingly engages the exterior sealing surface 56 of the seal fitting 30. The seal conduit 16 also surrounds and sealingly engages the cable 24. The lock ring 18 is threadably connected to the body 14 such that the end 62 of the seal conduit 16 is secured between the lock ring 18 and the seal fitting 30. The interface between the cable 24 and the body 14 is thereby sealed via the sealed engagement of the seal conduit 16 with the cable 24 and with the exterior sealing surface 56. The sealed connection of the seal conduit 16 to the body 14 and to the cable 24 using the lock ring 18 is substantially similar to that described and illustrated herein with respect to the cable entry seal 10 (FIGS. 1, 4, and 5) and therefore will not be described in more detail herein.

As described above, in the exemplary embodiment the collapsible nut 212 is collapsed during mounting of the cable entry seal 210 on the structure 12 via connection to the body 14. Alternatively, the collapsible nut 212 is collapsed before connecting the body 14 thereto. For example, before the body 14 is connected to the collapsible nut 212, the collapsible wall 220 may be collapsed to securely mount the collapsible nut 212 within the opening 22 of the structure 12. The body 14 can then be connected to the fastener 238 of the collapsible nut 212 to securely mount the body within the opening 22 of the structure 12. The collapsible wall 220 may be collapsed before being connected to the body 14 using any tool, such as, but not limited to, pliers, a threaded fastener, and/or the like.

Figure 8:
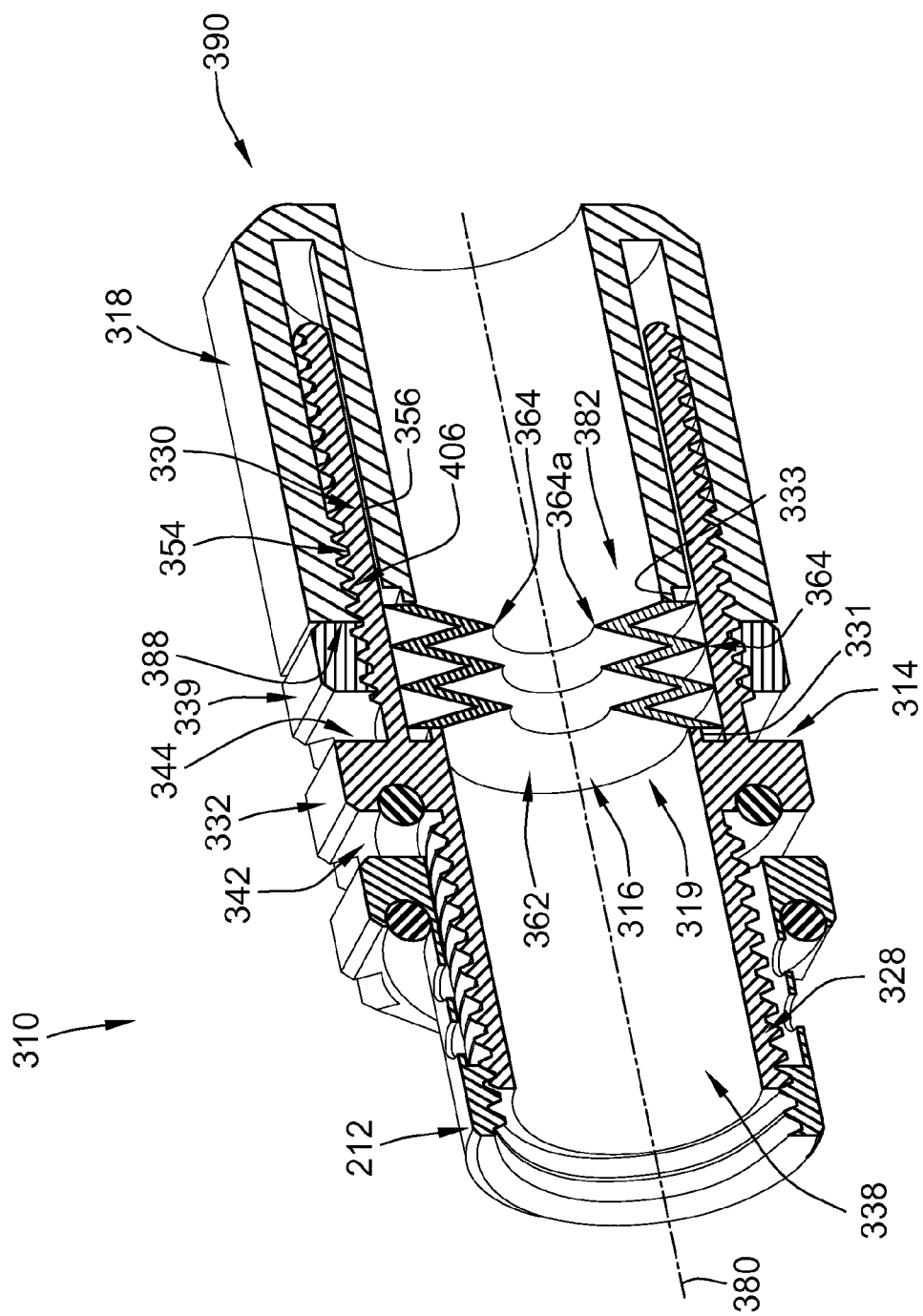
FIG. 8 is a cross sectional view of an exemplary alternative embodiment of a cable entry seal.

FIG. 8 is a cross sectional view of an exemplary alternative embodiment of a cable entry seal 310. The cable entry seal 310 includes a body 314, a seal conduit 316, a lock ring 318, and the collapsible nut 212. The cable entry seal 310 is configured to pass the cable 24 (FIGS. 4, 5, and 7) through the opening 22 (FIGS. 1, 4, and 7) within the structure 12 (FIGS. 1, 4, and 7). The collapsible nut 212 is described above. Although shown as including the collapsible nut 212, the cable entry seal 310 alternatively includes the fastener 20 (FIGS. 1 and 4).

The body 314 of the cable entry seal 310 includes a flange 332 extending a length from a side 342 to an opposite side 344. The flange 332 is substantially similar to the flange 32 (FIGS. 1, 2, 4, and 7) of the body 14 (FIGS. 1, 2, and 4-7) and therefore will not be described in more detail herein. The body 314 includes a nipple 328 extending outwardly from the side 342 of the flange 332, and a seal fitting 330 extending outwardly from the side 344 of the flange 332. The nipple 328 is substantially similar to the nipple 28 (FIGS. 1, 4, 6, and 7) and therefore will not be described in more detail herein. A passageway 338 extends through the length of the body 314. The passageway 338 receives the cable 24 therethrough.

The seal fitting 330 includes a fastener 354 and a sealing surface 356. The fastener 354 extends on a radially outer surface of the seal fitting 330, while a radially inner surface of the seal fitting 330 defines the sealing surface 356. A receptacle 331 is defined at the intersection of the seal fitting 330 and the flange 332 of the body 314. The lock ring 318 extends a length from a side 388 to a side 390. The lock ring 318 includes a fastener 406 that is configured to connect with the fastener 354 of the body 314. The side 388 includes a receptacle 333. The side 342 of the flange 332 may be referred to herein as a "structure side", while the side 344 of the flange 332 may be referred to herein as a "lock ring side".

Figure 9:
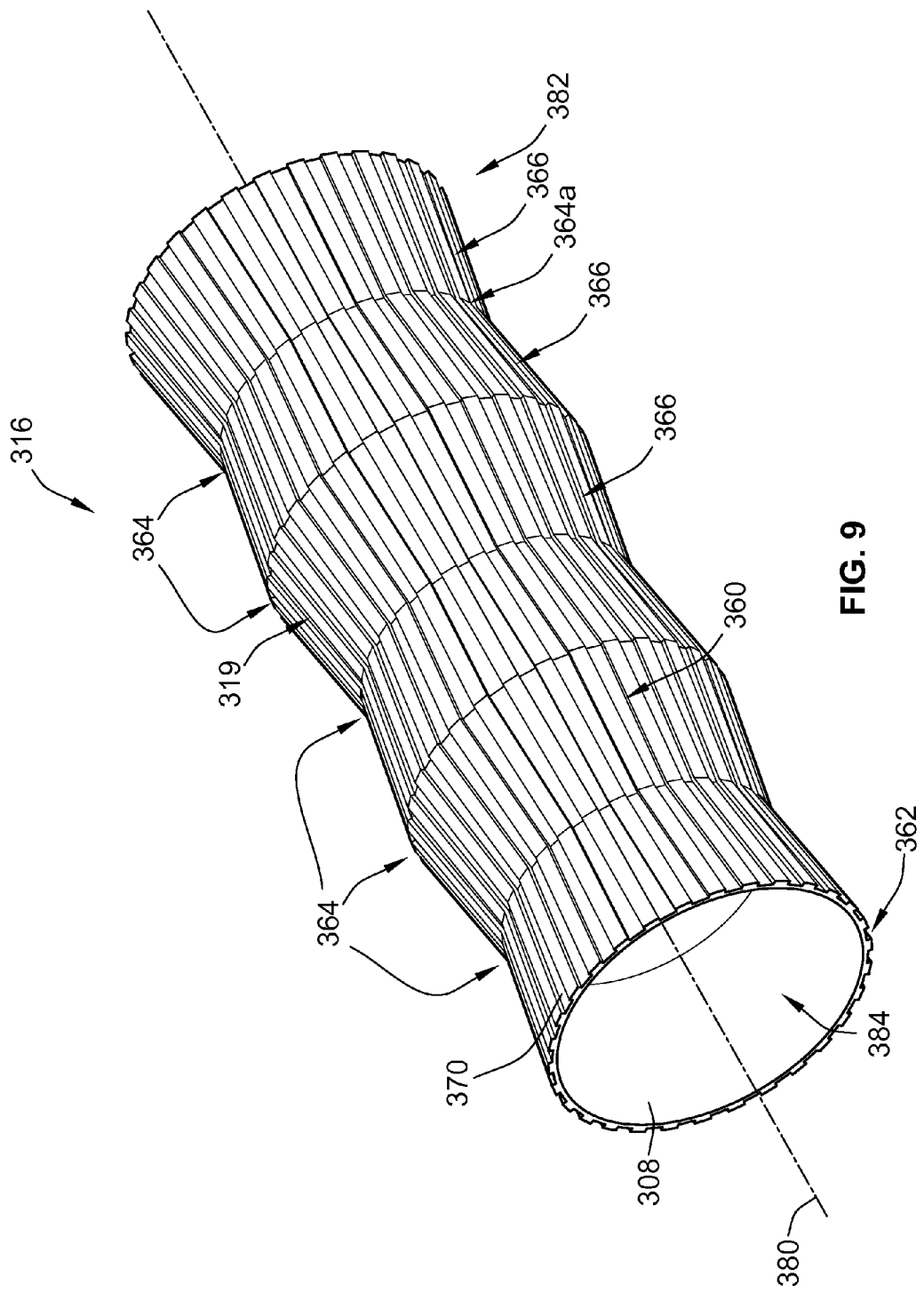
FIG. 9 is a perspective view of an exemplary embodiment of a seal conduit of the cable entry seal shown in FIG. 8.

FIG. 9 is a perspective view of an exemplary embodiment of a seal conduit 316 of the cable entry seal 310. The seal conduit 316 includes a cylindrical wall 319 that extends a length along a central longitudinal axis 380 from an end 362 to an opposite end 382. A passageway 384 extends through the length of the seal conduit 316. The passageway 384 receives the cable 24 (FIGS. 4, 5, and 7) therethrough. The wall 319 of the seal conduit 316 includes a plurality of fold points 364 distributed along the length of the seal conduit 316. The fold points 364 define intersections between sections 366 of the wall 319 that alternatingly flair radially inward and radially outward relative to the central longitudinal axis 380. A thickness of the wall 319 of the seal conduit 316 is optionally reduced at one or more of the fold points 364 relative to other portions of the wall 319. The wall 319 of the seal conduit 316 also includes an exterior surface 368 that optionally includes a plurality of grooves 370 extending therein.

The seal conduit 316 may be fabricated from any material(s) that enable the seal conduit 316 to function as described and/or illustrated herein. Exemplary materials of the seal conduit 316 include, but are not limited to, heat recoverable materials, cold recoverable materials, plastics, polymers, rubber, elastic materials, and/or the like. The seal conduit 316 may be fabricated using any method, process, structure, means, and/or the like, such as, but not limited to, extrusion, molding, and/or the like.

Referring again to FIG. 8, to assemble the seal conduit 316 with the body 314, the seal conduit 316 is received within the seal fitting 330 of the body 314 such that the end 362 of the seal conduit 316 is received within the receptacle 331 of the body 314. As the lock ring 318 is connected to the fastener 354 of the body 314, the end 382 of the seal conduit 316 is received within the receptacle 333 within the side 388 of the lock ring 318. Engagement of the wall 319 of the seal conduit 316 between the lock ring 318 and the flange 332 of the body 314 causes the wall 319 to collapse longitudinally along, and radially inward relative to, the central longitudinal axis 380 as the lock ring 318 is connected to the body 314. Specifically, the wall 319 collapses longitudinally by folding at the fold points 364. As the wall 319 collapses longitudinally, alternating ones 364a of the fold points 364 move radially inwardly relative to the central longitudinal axis 380 to sealingly engage the cable 24. Accordingly, the seal conduit 316 shrinks at the fold points 364a. The reduced thickness of the wall 319 at one or more of the fold points 364 may facilitate the wall 319 folding at the fold points 364. Moreover, the grooves 370 may facilitate the wall 319 collapsing radially inward relative to the central longitudinal axis 380. Once the lock ring 318 is fully connected to the body 314, the seal conduit 316 is sealingly engaged between the lock ring 318 and the flange 332, and the seal conduit 316 also surrounds and sealingly engages the cable 24 at the fold points 364a. Optionally, a jam nut 339 may be used to secure the lock ring 318 to the body 314. The connection of the body 314 to the structure 12 using the collapsible nut 212, or alternatively the fastener 20, is substantially similar to that described and illustrated herein with respect to the cable entry seals 210 (FIGS. 6 and 7) and 10 (FIGS. 1, 4, and 5), respectively, and therefore will not be described in more detail herein.

Figure 10:
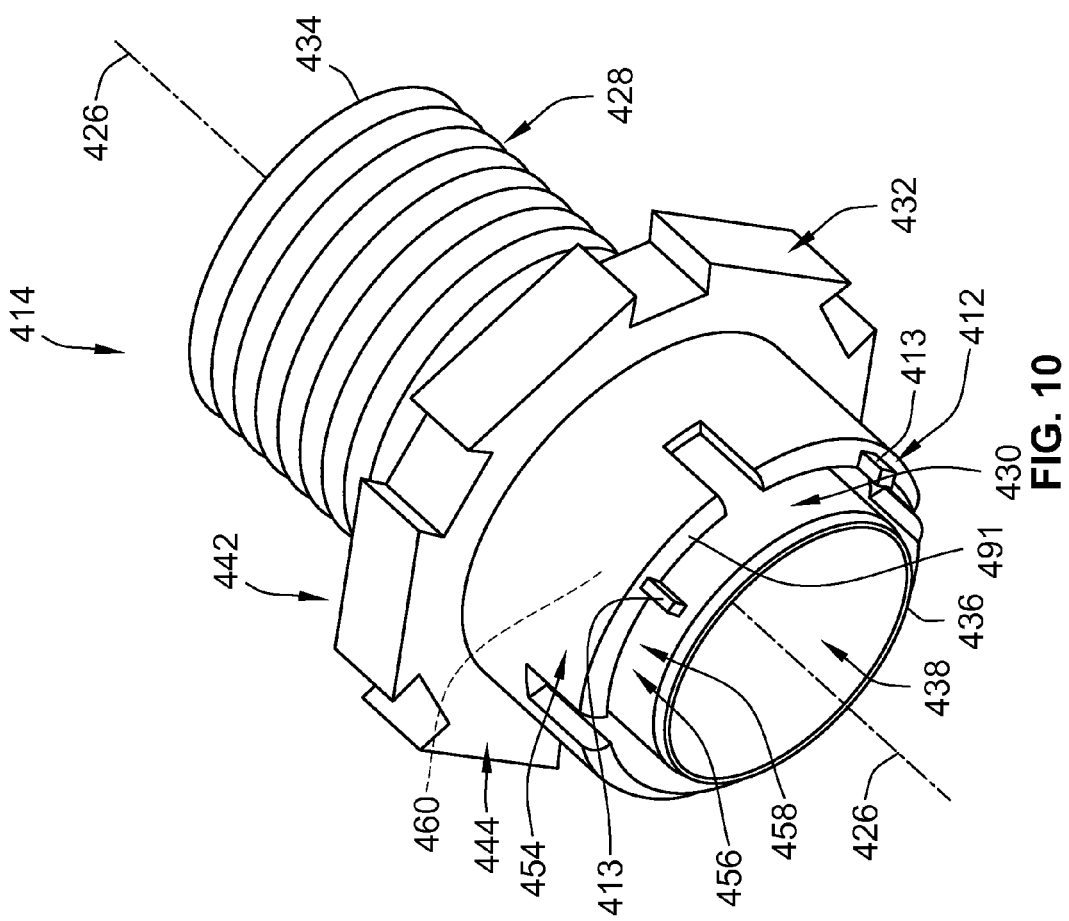
FIG. 10 is a perspective view of an exemplary alternative embodiment of a cable entry seal body.
Figure 11:
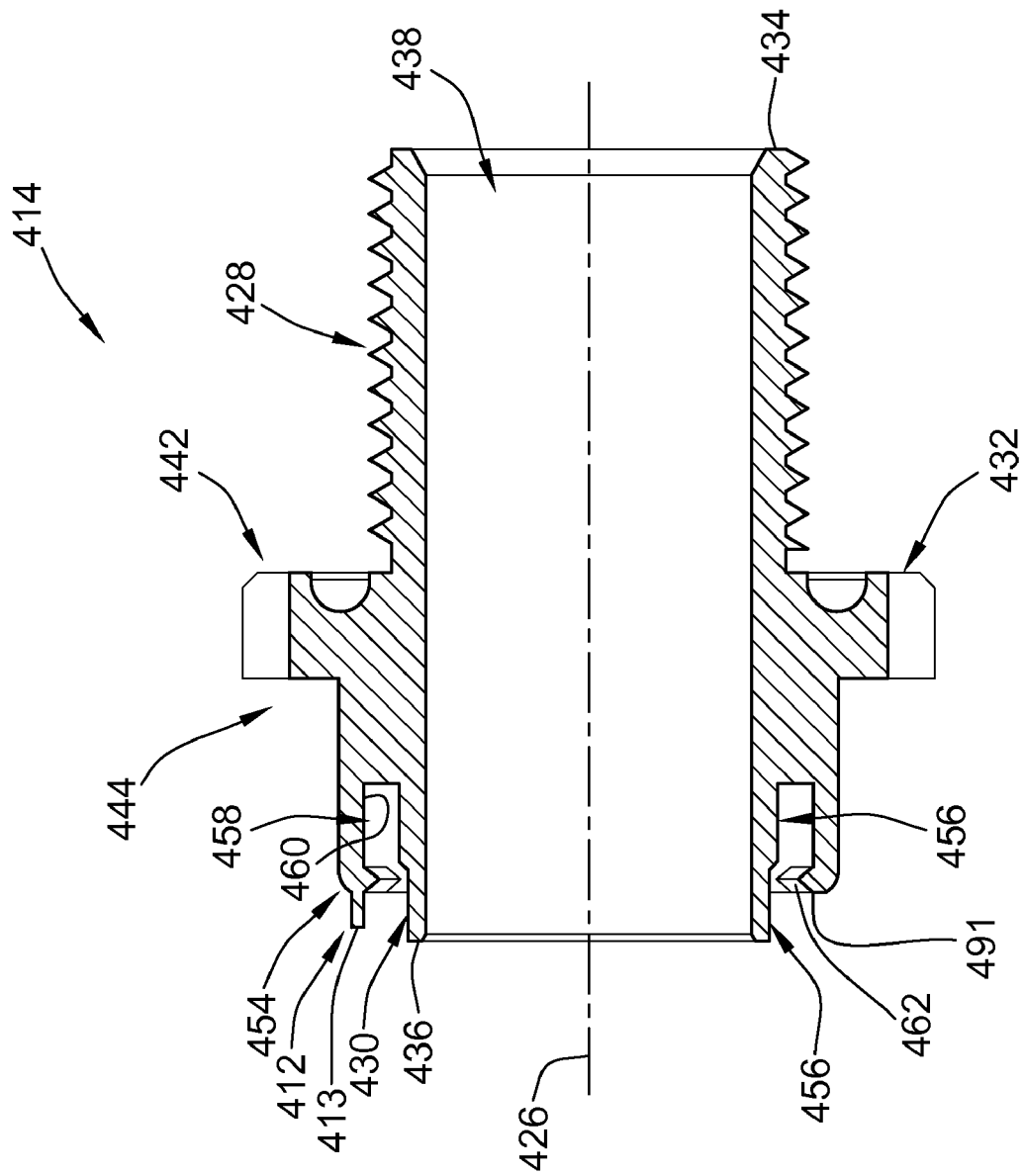
FIG. 11 is a cross sectional view of the body shown in FIG. 10.

FIG. 10 is a perspective view of an exemplary alternative embodiment of a cable entry seal body 414. FIG. 11 is a cross sectional view of the body 414. The body 414 extends a length along a central longitudinal axis 426 from an end surface 434 to an opposite end surface 436. The cable entry seal body 414 includes a flange 432 extending radially outward relative to the central longitudinal axis 426 and between the end surfaces 434 and 436 along the central longitudinal axis 426. The flange 432 extends a length along the central longitudinal axis 426 from a side 442 to an opposite side 444. The sides 442 and 444 of the flange 432 may each be referred to herein as a "structure side" and/or a "lock ring side". The flange 432 is substantially similar to the flange 32 (FIGS. 1, 2, 4, and 7) of the body 14 (FIGS. 1, 2, and 4-7) and therefore will not be described in more detail herein. A nipple 428 extends outwardly from the flange 432 along the central longitudinal axis 426 to the end surface 434. The nipple 428 is substantially similar to the nipple 28 (FIGS. 1, 4, 6, and 7) and therefore will not be described in more detail herein. A seal fitting 430 extends outwardly from the flange 432 along the central longitudinal axis 426, in an opposite direction relative to the nipple 428, to the end surface 436. A passageway 438 extends through the length of the body 414. Specifically, the passageway 438 extends along the central longitudinal axis 426 through the end surfaces 434 and 436 and completely through the body 414 therebetween. The passageway 438 receives the cable 24 (FIGS. 4, 5, and 7) therethrough.

The seal fitting 430 of the body 414 includes an exterior sealing surface 456. The seal fitting 430 extends outwardly from the flange 432 along the central longitudinal axis 426 to the end surface 436. Moreover, the exterior sealing surface 456 extends outwardly from the flange 432 along the central longitudinal axis 426 to the end surface 436. A ledge 454 extends outwardly from the flange 432 along the central longitudinal axis 426 in a direction toward the end surface 436. The ledge 454 is spaced from the exterior sealing surface 456 radially outward relative to the central longitudinal axis 426. In other words, there is a radial gap 458 between the exterior sealing surface 456 and a radially inner surface 460 of the ledge 454. The radial gap 458 is configured to receive the end 62 (FIGS. 1, 4, 5, and 7) of the seal conduit 16 (FIGS. 1 and 4-7) therein. The radially inner surface 460 of the ledge 454 includes one or more tabs 462 (not visible in FIG. 9) that extend radially inward toward the exterior sealing surface 456. The exterior sealing surface 456 includes an optional ledge 464 (not visible in FIG. 9). In the exemplary embodiment, the ledge 464 extends at a non-perpendicular angle (such as, but not limited to, approximately 45°) relative to the central longitudinal axis 426. The ledge 464 may alternatively extend approximately perpendicular to the central longitudinal axis 426.

To assemble the seal conduit 16 with the body 414, the seal fitting 430 of the body 414 is received within the end 62 of the seal conduit 16 such that the end 62 surrounds and sealingly engages the exterior sealing surface 456 of the seal fitting 430. The end 62 of the seal conduit 16 is received within the radial gap 458 between the ledge 454 and the exterior sealing surface 456. The tabs 462 engage the seal conduit 16 such that the end 62 of the seal conduit 16 is sealingly engaged between the ledge 464 of the exterior sealing surface 56 and the tabs 462. The tabs 462 thereby facilitate holding the end 62 of the seal conduit 16 on the exterior sealing surface 456 of the seal fitting 430. Optionally, the seal conduit 16 includes an adhesive (not shown) to facilitate sealingly engaging the seal conduit 16 with the cable 24 and/or with the exterior sealing surface 456 of seal fitting 430. The seal conduit 16 is optionally heat shrunk around the exterior sealing surface 456 and/or the cable 24 to facilitate sealingly engaging the seal conduit 16 with the exterior sealing surface 456 and/or the cable 24. Optionally, the seal conduit 16 is shrunk around the exterior sealing surface 456 and/or the cable 24 without the application of heat to facilitate sealingly engaging the seal conduit 16 with the exterior sealing surface 456 and/or the cable 24.

The body 414 optionally includes a heat indicator 412 for indicating whether excess heat has been applied to the body 414 and/or any other portion of the cable entry seal. In the exemplary embodiment, the heat indicator 412 includes a plurality of rods 413 that extend outward from a surface 491 of the ledge 454. The rods 413 are configured to melt when subjected to heat over a predetermined temperature and/or over a predetermined duration of time. The predetermined temperature and/or the predetermined duration of time may be selected as a threshold for a temperature and/or an exposure time that may damage the body 414 and/or any other portion of the cable entry seal. In the exemplary embodiment, each of the rods 413 extends outwardly from the surface 491 approximately parallel to the central longitudinal axis 426. However, each rod 413 may extend outwardly from the surface 491 at any angle relative to the central longitudinal axis 426. The body 414 may include any number of the rods 413. Each rod 413 may be fabricated from any material(s) that enables the rod 413 to melt when subjected to heat over the predetermined temperature and/or over the predetermined duration of time, such as, but not limited to, plastics, polymers, and/or the like.

The embodiments described and/or illustrated herein provide a cable entry seal that may be less expensive and/or easier to install than at least some known cable entry seals. The embodiments described and/or illustrated herein provide a cable entry seal having a reduced number of parts as compared to at least some known cable entry seals.

Exemplary embodiments are described and/or illustrated herein in detail. The embodiments are not limited to the specific embodiments described herein, but rather, components and/or steps of each embodiment may be utilized independently and separately from other components and/or steps described herein. Each component, and/or each step of one embodiment, can also be used in combination with other components and/or steps of other embodiments. When introducing elements/components/etc. described and/or illustrated herein, the articles "a", "an", "the", "said", and "at least one" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc. Moreover, the terms "first," "second," and "third," etc. in the claims are used merely as labels, and are not intended to impose numerical requirements on their objects. Dimensions, types of materials, orientations of the various components, and the number and positions of the various components described and/or illustrated herein are intended to define parameters of certain embodiments, and are by no means limiting and are merely exemplary embodiments. Many other embodiments and modifications within the spirit and scope of the claims will be apparent to those of skill in the art upon reviewing the description and illustrations. The scope of the subject matter described and/or illustrated herein should therefore be determined with reference to the appended claims, along with the full scope of equivalents to which such claims are entitled. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

While the subject matter described and/or illustrated herein has been described in terms of various specific embodiments, those skilled in the art will recognize that the subject matter described and/or illustrated herein can be practiced with modification within the spirit and scope of the claims.

What is claimed is:

1. A cable entry seal for passing a cable through an opening within a structure, said cable entry seal comprising:
    a body extending a length, a passageway extending through the length of the body, the passageway being configured to receive the cable therethrough, the body comprising a flange and a seal fitting extending outwardly from the flange, the seal fitting comprising an exterior sealing surface comprising a ledge;
    a seal conduit having a sealing end surrounding and sealingly engaged with the exterior sealing surface of the seal fitting, the seal conduit being configured to surround the cable when the cable is received through the passageway of the body; and
    a lock ring connected to the body, the lock ring comprising a shoulder having a curved edge, the lock ring surrounding and sealingly engaged with the sealing end of the seal conduit such that the sealing end of the seal conduit is held between the curved edge of the shoulder and the ledge of the exterior sealing.

2. The cable entry seal according to claim 1, wherein the lock ring is threadably connected to the body.

3. The cable entry seal according to claim 1, further comprising an adhesive, wherein the sealing end of the seal conduit is sealingly engaged with the exterior sealing surface of the seal fitting using the adhesive.

4. A cable entry seal for passing a cable through an opening within a structure, said cable entry seal comprising:
    a body extending a length, a passageway extending through the length of the body, the passageway being configured to receive the cable therethrough, the body comprising a flange and
    a seal fitting extending outwardly from the flange, the seal fitting comprising an exterior sealing surface.
    a seal conduit having a sealing end surrounding and sealingly engaged with the exterior sealing surface of the seal fitting, the seal conduit being configured to surround the cable when the cable is received through the passageway of the body; and
    a lock ring connected to the body, the lock ring surrounding and sealingly engaged with the sealing end of the seal conduit such that the sealing end is held between the exterior sealing surface of the seal fitting and the lock ring, the lock ring comprising a heat indicator for indicating when excessive heat has been applied to the cable entry seal.

5. A cable entry seal for passing a cable through an opening within a structure, the structure having opposite first and second sides, said cable entry seal comprising:
    a body extending a length, a passageway extending through the length of the body, the passageway being configured to receive the cable therethrough, the body comprising a flange and a nipple extending outwardly from the flange, the flange extending on the first side of the structure; and
    a collapsible nut comprising a base, a fastener, and a collapsible wall extending from the base to the fastener, the base extending on the first side of the structure, the collapsible wall being received through the opening and extending outwardly from the opening on the second side of the structure, the flange of the body being engaged with the base, the fastener being connected to the nipple of the body, wherein the collapsible wall is at least partially collapsed and engaged with the structure on the second side of the structure.

6. The cable entry seal according to claim 5, wherein the collapsible nut extends a length along a central longitudinal axis, and wherein connection to the nipple causes the collapsible wall to collapse along the central longitudinal axis such that portions of the collapsible wall deform radially outward relative to the central longitudinal axis.

7. The cable entry seal according to claim 5, wherein the collapsible nut extends a length along a central longitudinal axis, and connecting the nipple to the fastener pulls the fastener toward the base along the central longitudinal axis thereby collapsing the collapsible wall along the central longitudinal axis.

8. The cable entry seal according to claim 5, wherein the nipple comprises an exterior thread and the fastener of the collapsible nut comprises an interior thread, the exterior thread of the nipple being engaged with the interior thread of the fastener.

9. The cable entry seal according to claim 5, wherein the collapsible nut comprises an aperture extending through the base, the collapsible wall, and at least a portion of the fastener, the nipple of the body being received into the aperture through the base such that nipple extends outwardly from the flange through the base and the collapsible wall to the fastener.

10. The cable entry seal according to claim 5, wherein the base of the collapsible nut is sealingly engaged with the structure on the first side of the structure.

11. The cable entry seal according to claim 5, wherein the body comprises a flange, the nipple extending outwardly from the flange, the flange being sealingly engaged with the base of the collapsible nut.

12. A cable entry seal for passing a cable through an opening within a structure, said cable entry seal comprising:
 a body extending a length, a passageway extending through the length of the body, the passageway being configured to receive the cable therethrough, the body comprising a flange and a seal fitting extending outwardly from the flange, the seal fitting comprising an exterior sealing surface and a ledge, the ledge being spaced from the exterior sealing surface to define a radial gap between the exterior sealing surface and the ledge, the ledge comprising (i) a tab extending from the ledge toward the exterior sealing surface, and (ii) a heat indicator for indicating when excessive heat has been applied to the cable entry seal; and
 a seal conduit having a sealing end surrounding and sealingly engaged with the exterior sealing surface of the seal fitting, the sealing end being received within the radial gap between the ledge and the exterior sealing surface, the sealing end being engaged by the tab, the seal conduit being configured to surround the cable when the cable is received through the passageway of the body.

\* \* \* \* \*